United States Patent [19]
Wada

[11] Patent Number: 5,262,102
[45] Date of Patent: Nov. 16, 1993

[54] PROCESS FOR FIRING CERAMIC HONEYCOMB STRUCTURAL BODIES

[75] Inventor: Yukihisa Wada, Aichi, Japan
[73] Assignee: NGK Insulators, Ltd., Japan
[21] Appl. No.: 947,926
[22] Filed: Sep. 21, 1992
[30] Foreign Application Priority Data
Sep. 30, 1991 [JP] Japan .................. 3-251661
[51] Int. Cl.$^5$ .............................. C04B 35/14
[52] U.S. Cl. ........................ 264/66; 264/63; 264/65
[58] Field of Search .................. 264/65, 66, 63
[56] References Cited
U.S. PATENT DOCUMENTS

| | | | |
|---|---|---|---|
| 3,950,175 | 4/1976 | Lachman et al. | 106/40 |
| 4,280,845 | 7/1981 | Matshisa | 264/66 |
| 4,353,854 | 10/1982 | Oyamada | 264/66 |
| 5,046,946 | 9/1991 | Yasuda | 264/66 |
| 5,114,644 | 5/1992 | Beall | 264/66 |

FOREIGN PATENT DOCUMENTS

| | | |
|---|---|---|
| 0227482 | 7/1987 | European Pat. Off. . |
| 0232621 | 8/1987 | European Pat. Off. . |
| 57-28390 | 6/1982 | Japan . |
| 2255576 | 10/1990 | Japan . |

Primary Examiner—James Derrington
Attorney, Agent, or Firm—Parkhurst, Wendel & Rossi

[57] ABSTRACT

A ceramic honeycomb structural body-firing process includes the steps of: formulating a raw material from talc, kaolin and other cordierite-forming materials to give cordierite having a chemical composition of $SiO_2$: 42–56% by weight, $Al_2O_3$: 30–45% by weight and MgO: 12–16% by weight as a main component and a crystalline phase mainly composed of cordierite, shaping a honeycomb structural body from the resulting mixture by extrusion, and firing the honeycomb structural body. In the firing step, a heating rate in a temperature range in which the honeycomb structural body is thermally shrunk is set at not less than 20° C./hr but not more than 60° C./hr, the heating rate in a temperature range in which the solid phase reaction of the honeycomb structure body proceeds is set at not less than 80° C./hr but not more than 130° C./hr, and the heating rate in a temperature range in which the liquid phase reaction of the honeycomb structural body proceeds is set at not less than 20° C./hr but not more than 60° C./hr.

3 Claims, 3 Drawing Sheets

PROCESS FOR FIRING CERAMIC HONEYCOMB STRUCTURAL BODIES

BACKGROUND OF THE INVENTION (1) Field of the Invention:

The present invention relates to a process for firing cordierite-based ceramic honeycomb structural bodies. In particular, the invention relates to the firing process suitable for firing honeycomb structural catalyst carriers having high strength and low thermal expansivity and being adapted to be used for the purification of exhaust gases from automobiles.

(2) Related Art Statement:

Heretofore, it has been conventional practice to produce cordierite-based ceramic honeycomb structural bodies by the steps of forming a ceramic body through formulating and mixing a cordierite-forming raw ceramic material with a shaping aid or a pore-forming agent, producing a ceramic honeycomb-shaped body by extruding the resulting ceramic body, and firing the ceramic honeycomb-shaped body at a given temperature in a continuous kiln or a periodic kiln.

Among other characteristics, the ceramic honeycomb structural bodies to be used as catalyst carriers for the purification of exhaust gases from automobiles must have a high water-absorbing rate to improve catalyst-carrying ability and a low coefficient of thermal expansion to improve thermal shock resistance. In order to attain appropriate values of the product characteristics, it has been a conventional practice to control the maximum temperature and the holding time at the maximum temperature during firing.

Now, consider the case where the honeycomb structural body is produced by controlling the maximum temperature and the holding time as mentioned above. In order to increase the water-absorbing rate, since the porosity in honeycomb ribs needs to be increased, it is necessary to restrain the sintering by lowering the maximum temperature or by reducing the holding time during firing. On the other hand, in order to lower the coefficient of thermal expansion, since the body needs to be densified, it is necessary to promote sintering through raising the maximum temperature or prolonging the holding time during firing.

Therefore, both the high water-absorbing rate and the low coefficient of thermal expansion cannot be optimized only by controlling the maximum temperature and the holding time during firing. Further, since the characteristics of the product may largely change due to variation in properties of the raw materials, such as grain size or the average particle diameter, it is difficult stably to obtain various characteristics only by controlling the maximum temperature and the holding time.

On the other hand, Japanese patent application Laid-open No. 53-82,822 discloses a technique to attain a low coefficient of thermal expansion through the adjustment of the raw materials, in which the coefficient of thermal expansion can be lowered by increasing the heating rate in a temperature range of not less than 1,100° C. However, this technique is insufficient from the standpoint of simultaneously attaining low thermal expansivity and high porosity.

SUMMARY OF THE INVENTION

It is an object of the present invention to solve the above-mentioned problems, and to provide a process for firing ceramic honeycomb structural bodies which have both a high water-absorbing rate and a low coefficient of thermal expansion.

The present invention is directed to the ceramic honeycomb structural body-firing process including the steps of formulating a raw material from talc, kaolin and other cordierite-forming material to give cordierite having the chemical composition of $SiO_2$: 42–56% by weight, $Al_2O_3$: 30–45% by weight and MgO: 12–16% by weight as main components and containing a crystalline phase mainly composed of cordierite, shaping a green honeycomb structural body from the mixture by extrusion, and firing the green honeycomb structural body at a given temperature in a given atmosphere, wherein a heating rate in a temperature range in which the honeycomb structural body is thermally shrunk is set at not less than 20° C./hr but not more than 60° C./hr, the heating rate in a temperature range in which the solid phase reaction of the honeycomb structural body proceeds is set at not less than 80° C./hr but not more than 130° C./hr, and the heating rate in a temperature range in which the liquid phase reaction of the honeycomb structural body proceeds is set at not less than 20° C./hr but not more than 60° C./hr.

Heretofore, such bodies were heated to the holding temperature at a constant heating rate, for example, 60° C./hr. On the other hand, according to the heating schedule of the present invention, the heating rate is variable (i.e., not less than 20° C./hr but not more than 60° C./hr in the temperature range of about 1,100° to about 1,200° C. in which the honeycomb structural body is thermally shrunk; not less than 80° C./hr but not more than 130° C./hr in the temperature range of about 1,200° C. to about 1,300° C. in which the solid phase reaction of the honeycomb structural body proceeds; and not less than 20° C./hr but not more than 60° C./hr in the temperature range of about 1,300° C. or more in which the liquid phase reaction of the honeycomb structural body proceeds). The inventors first discovered that the product characteristics, (i.e., the high water-absorbing rate and the low coefficient of thermal expansion) which previously could not be simultaneously realized, can be satisfied by this heating schedule.

That is, since the heating rate in the temperature range of about 1,100° to about 1,200° C. causing thermal shrinkage is set at not less than 20° C./hr but not more than 60° C./hr, the densification slowly proceeds to attain the low coefficient of thermal expansion. Further, since the heating rate is set at not less than 80° C./hr but not more than 130° C./hr in the temperature range of about 1,200° C. to about 1,300° C. in which the solid phase reaction proceeds, crystallization of undesirable cordierite, which will interrupt the crystallization of the cordierite in the succeeding liquid phase reaction, is suppressed during the solid phase-reaction, and the low coefficient of thermal expansion and the high water-absorbing rate can be realized. In addition, since the heating rate is set at not less than 20° C./hr but not more than 60° C./hr in the temperature range of not less than about 1,300° C. to the holding temperature in which the liquid phase reaction proceeds, the desirable cordierite is slowly crystallized during liquid phase-reaction, which is the main reaction, to attain the low coefficient of thermal expansion.

It is preferable that the heating rate is 30° C./hr–50° C./hr in the thermal shrinkage temperature range, 90° C./hr–110° C./hr in the solid phase reaction temperature range, and 30° C./hr-50° C./hr in the liquid phase reaction temperature range.

The reason why the heating rate during shrinkage in the temperature range of about 1,100° to about 1,200° C. is set at not less than 20° C./hr but not more than 60° C./h is that the body is slowly shrunk and densified to lower the coefficient of thermal expansion. Further, it is presumed that since the gaps between the particles of the raw material decrease with progress in the densification, the material is more easily converted to cordierite in the course of the liquid phase reaction to lower the coefficient of thermal expansion and increase the open porosity (water-absorbing rate). If the heating rate in the thermal shrinkage temperature range is more than 60° C./hr, the coefficient of thermal expansion unfavorably becomes higher. Further, if the heating rate is greater than 80° C./h in the shrinkage temperature range, variation in dimensions between upper and lower portions of the shaped body due to difference in temperature occurs in the shaped body. Thus, it is effective that the heating rate is slowed from this standpoint.

These and other objects, features and advantages of the invention will be appreciated upon reading of the following description of the invention when taken in conjunction with the attached drawings, with the understanding that some modifications, changes and variations can be made by the skilled person in the art to which the invention pertains without departing from the spirit of the invention or the scope of claims appended hereto.

BRIEF DESCRIPTION OF THE ATTACHED DRAWINGS

For a better understanding of the invention, reference is made to the attached drawings, wherein.

DETAILED DESCRIPTION OF THE INVENTION

Figure 1:
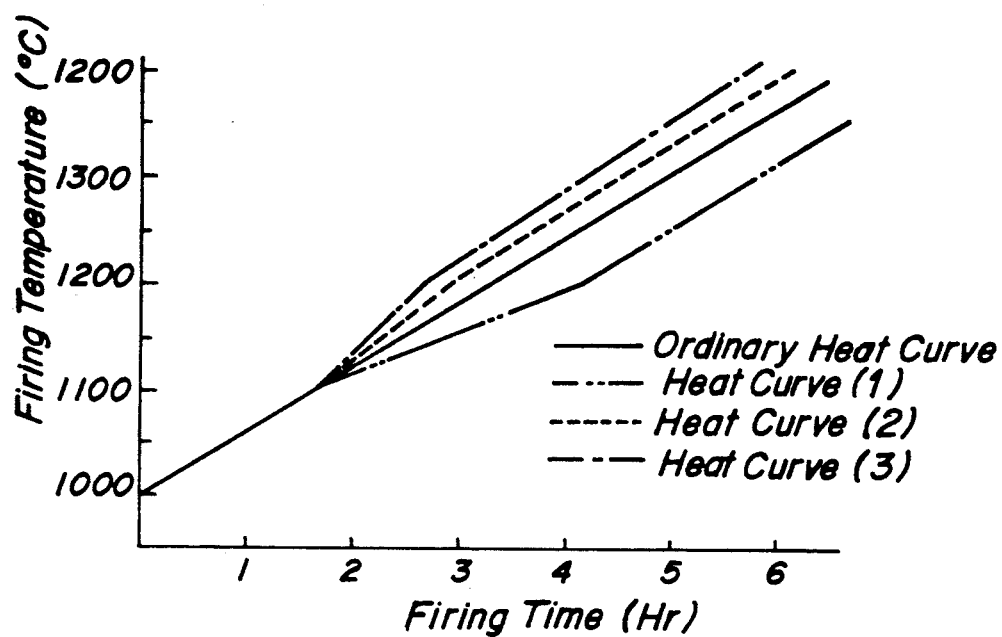
FIG. 1 is a graph illustrating an ordinary heat curve and heat curves (1), (2) and (3) for examining the firing process of the present invention.

The present invention will be explained more concretely with reference to the following examples.

Ceramic honeycomb-shaped bodies to which the firing process according to the present invention is applicable will be obtained as follows:

First, fine powders of talc, kaolin, alumina and other cordierite raw materials are selectively formulated to give $SiO_2$: 42-56% by weight, preferably 47-53% by weight, $Al_2O_3$: 30-45% by weight, preferably 32-38% by weight, and MgO: 12-16% by weight, preferably 12.5-15% by weight around a theoretical cordierite composition point formerly known as the composition of a lower thermal expansion cordierite ceramic. The formulated material is then mixed and kneaded. Then, a shaping aid and/or a pore-forming agent is/are added into the resulting mixture to plasticize it to be extrudable, and the mixture is extruded into a honeycomb structural body. This shaped body is dried to obtain a green ceramic honeycomb structural body.

Fine talc powder containing a low amount of alkaline component is particularly preferred. In making the powder of talc or kaolin finer, it is preferable to use calcined talc or calcined kaolin which is effective for the prevention of the cracking of the honeycomb structural body owing to the shrinkage during drying and firing. The calcined talc or calcined kaolin is adjusted to have the same average particle diameter as that of the raw material. As the shaping aid, an organic binder such as methyl cellulose, carboxymethyl cellulose, polyvinyl alcohol, starch paste, wheat powder, or glycerin, a surface active agent or wax may be selectively employed depending upon use. As the pore-forming agent, an appropriate one may be preferably selected among graphite, starch and wood chips.

Thereafter, the resulting green ceramic honeycomb-shaped structural body is heated to the holding temperature, for example, 1,410° C. at the ordinary heating rate of 60° C./hr, except that the heating rate is (1) not less than 20° C./hr but not more than 60° C./hr in the temperature range in which the honeycomb structural body is thermally shrunk, (2) not less than 80° C./hr but not more than 130° C./hr in the temperature range of about 1,200° C. to about 1,300° C. in which the solid phase reaction proceeds, and (3) not less than 20° C./hr but not more than 60° C./hr in the temperature range of about 1,300° C. to about 1,400° C. in which the liquid phase reaction proceeds.

Examples of the present invention will be explained below.

EXAMPLES

A ceramic raw material was obtained by formulating and mixing talc, kaolin and alumina raw materials to give a chemical composition of cordierite, and the mixture was plasticized by adding methyl cellulose thereto as a shaping aid. The plasticized mixture was shaped and dried to obtain a green honeycomb-shaped body having an elliptic cylindrical shape with 150 mm in major axis, 80 mm in minor axis and 150 mm in length. A plurality of green honeycomb-shaped structural bodies having the same shape were produced.

First, in order to examine the influences of the heating rate upon the green honeycomb-shaped structural bodies, the honeycomb-shaped structural bodies were placed on a shelf in a muffle kiln, and fired while the heating rate was varied as shown in Table 1 with respect to the temperature range of about 1,100° C. to about 1,200° C. in which the honeycomb structural bodies thermally shrunk, the temperature range of about 1,200° C. to about 1,300° C. in which the solid phase reaction proceeded, and the temperature range of about 1,300° C. to about 1,400° C. in which the liquid phase reaction proceeded. Thereby, the honeycomb structural bodies were obtained. Various characteristics shown in Table 1 were measured with respect to the thus obtained honeycomb structural bodies, and influences on these characteristics were examined. After the temperature reached the holding temperature of 1,410° C. by heating, the honeycomb structural bodies were held at this temperature for 4 hours, and cooled at a cooling rate of 150° C./hr.

The coefficient of thermal expansion was measured in a temperature range of 40°-800° C. in a honeycomb-extruded direction. The water-absorbing rate was measured in such a manner that the honeycomb structural body was dipped into water at 30° C. for 2 minutes for simulation of carrying a catalyst, excess water was removed with compressed air at a rate of 1.4 kgf/cm², and the coefficient of water absorbed was determined as a weight percentage relative to a weight of the dried honeycomb structural body, i.e., {(weight after water absorption−dried weight)/dried weight}×100. For the evaluation of the thermal shock resistance, the temperature which cracked the honeycomb structural body was determined by removing the honeycomb structural body from an electric furnace and cooling to room temperature. The honeycomb structural bodies were heated incrementally (25° C. steps from 700° C.) in the electric furnace, and were held at each temperature for 20 minutes. Cracks were detected by tapping the honeycomb structural bodies. Results are shown in Table 1.

the temperature range of about 1,300° C. to about 1,400° C. is lowered, the coefficient of thermal expansion tended to decrease, and that excellent characteristics can be obtained when the heating rate in this temperature range is set at not less than 20° C./hr but not more than 60° C./hr.

In view of the results given in Table 1, it was presumed that the heat curve would be excellent in which the heating rate in the temperature range of about 1,100° C. to about 1,200° C. is not less than 20° C./hr but not more than 60° C./hr, the heating rate in the temperature range of about 1,200° C. to about 1,300° C. is not less than 80° C./hr but not more than 130° C./hr and the heating rate in the temperature range of about 1,300° C. to about 1,400° C. is not less than 20° C./hr but not more than 60° C./hr. Based on this presumption, honeycomb-shaped structural bodies were actually fired according to heat curves specified in Table 2, and characteristics

TABLE 1

| Heating curve | | Ordinary firing | (1) | (2) | (3) | (4) | (5) | (6) | (7) | (8) | (9) | (10) |
|---|---|---|---|---|---|---|---|---|---|---|---|---|
| Heating rate (°C./Hr) | 1100–1200° C. | 60 | 20 | 80 | 120 | 60 | 60 | 60 | 60 | 60 | 60 | 60 |
| | 1200–1300° C. | 60 | 60 | 60 | 60 | 20 | 80 | 110 | 130 | 60 | 60 | 60 |
| | 1300–1400° C. | 60 | 60 | 60 | 60 | 60 | 60 | 60 | 60 | 20 | 80 | 120 |
| Water-absorbing rate (%) | | 18.3 | 19.0 | 17.7 | 17.5 | 17.0 | 18.7 | 19.5 | 18.7 | 18.0 | 18.5 | 19.0 |
| porosity (%) | | 39.2 | 39.7 | 38.7 | 38.4 | 38.0 | 39.4 | 40.1 | 39.4 | 38.7 | 39.3 | 39.7 |
| Coefficient of thermal expansion ($\times 10^{-6}$/°C.) | | 0.55 | 0.52 | 0.60 | 0.70 | 0.75 | 0.48 | 0.43 | 0.48 | 0.50 | 0.62 | 0.65 |
| Thermal shock-resisting temperature (°C.) | | 800 | 850 | 775 | 750 | 700 | 875 | 925 | 875 | 875 | 775 | 775 |

Table 1 shows the results of various characteristics of the honeycomb structural bodies fired according to the ordinary heat curve, and the heat curves (1), (2) and (3), and it is seen that when the heating rate in the temperature range of about 1,100° C. to about 1,200° C. is slowed, the coefficient of thermal expansion tends to decrease and the water-absorbing rate (porosity) tends to increase, and that excellent characteristics can be obtained when the heating rate in this temperature range is set at not less than 20° C./hr but not more than 60° C./hr.

Table 1 also shows the results of various characteristics of the honeycomb structural bodies fired according to the ordinary heat curve, and the heat curves (4), (5), (6) and (7), and it is seen that when the heating rate in the temperature range of about 1,200° C. to about 1,300° C. is raised, the coefficient of thermal expansion tends to decrease and the water-absorbing rate (porosity) tends to increase, and that excellent characteristics can be obtained when the heating rate in this temperature range is set at not less than 80° C./hr but not more than 130° C./hr.

Table 1 further shows the results of various characteristics of the honeycomb structural bodies fired according to the ordinary heat curve, and the heat curves (8), (9) and (10), it is seen that when the heating rate in were examined with respect to the thus obtained honeycomb structural bodies in the same manner as in Table 1. Results are shown in Table 2.

TABLE 2

| Heat curve | | Ordinary firing | (11) | (12) | (13) | (14) | (15) | (16) | (17) | (18) | (19) | (20) | (21) |
|---|---|---|---|---|---|---|---|---|---|---|---|---|---|
| Heating rate (°C./Hr) | 1100–1200° C. | 60 | 60 | 50 | 30 | 20 | 60 | 60 | 60 | 60 | 60 | 60 | 40 |
| | 1200–1300° C. | 60 | 80 | 80 | 80 | 80 | 90 | 110 | 130 | 80 | 80 | 80 | 100 |
| | 1300–1400° C. | 60 | 60 | 60 | 60 | 60 | 60 | 60 | 60 | 20 | 30 | 50 | 40 |
| Water-absorbing rate (%) | | 18.3 | 18.7 | 19.0 | 19.1 | 18.7 | 19.4 | 19.5 | 18.7 | 18.7 | 19.2 | 19.3 | 19.8 |
| Porosity (%) | | 39.2 | 39.4 | 39.7 | 39.9 | 39.4 | 40.5 | 40.1 | 39.4 | 39.4 | 40.1 | 39.9 | 40.6 |
| Coefficient of thermal expansion ($\times 10^{-6}$/°C.) | | 0.55 | 0.48 | 0.45 | 0.46 | 0.49 | 0.43 | 0.43 | 0.48 | 0.48 | 0.44 | 0.44 | 0.40 |
| Thermal shock-resisting temperature (°C.) | | 800 | 875 | 900 | 985 | 870 | 930 | 925 | 875 | 875 | 910 | 915 | 950 |

Figure 2:
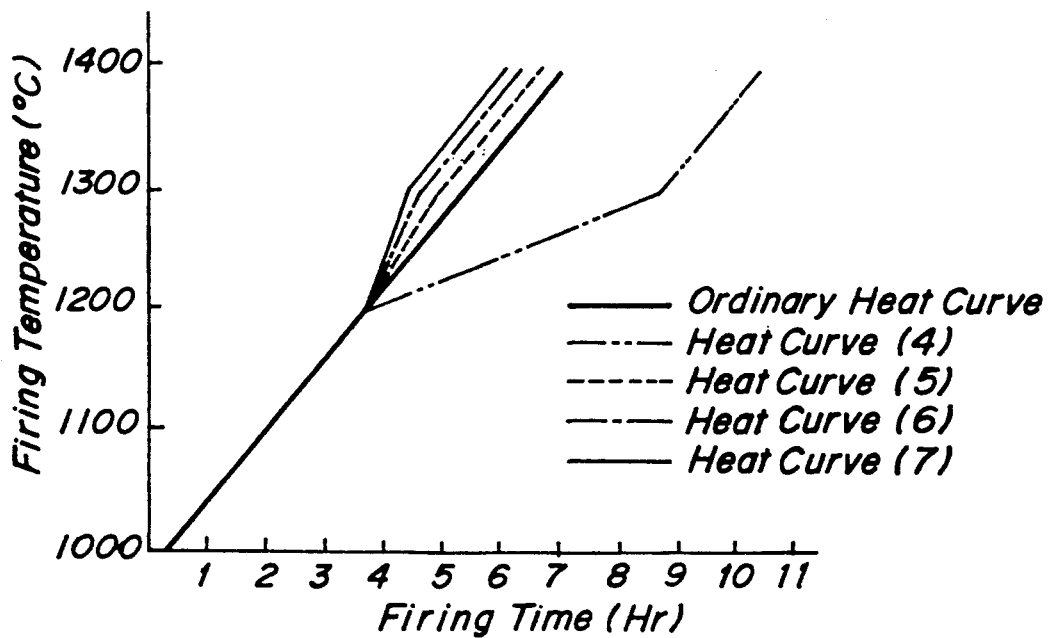
FIG. 2 is a graph illustrating an ordinary heat curve and heat curves (4), (5), (6) and (7) for examining the firing process of the present invention.
Figure 3:
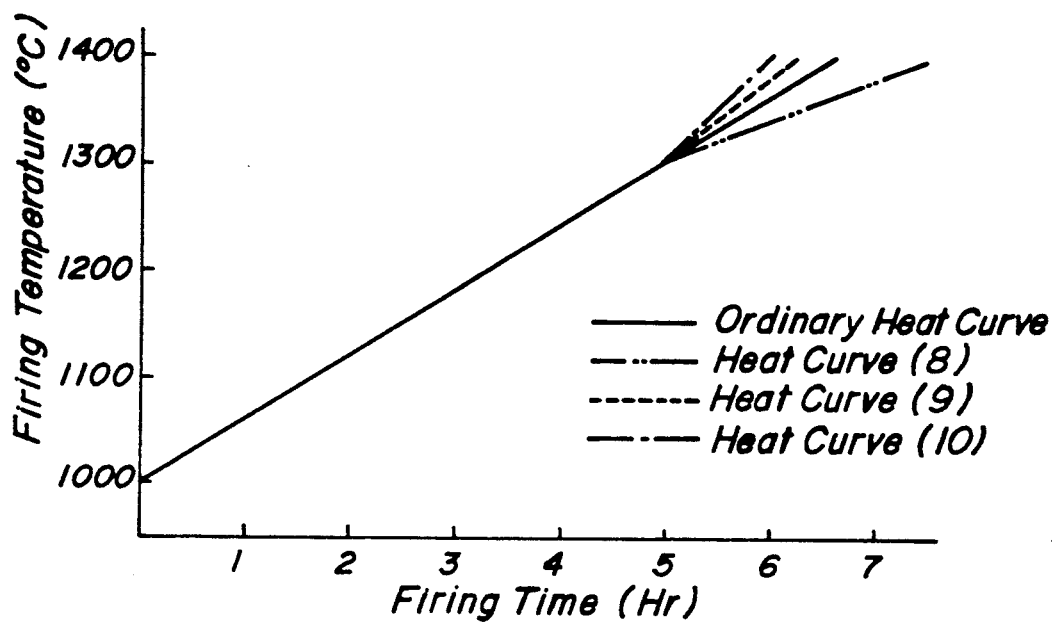
FIG. 3 is a graph illustrating an ordinary heat curve and heat curves (8), (9) and (10) for examining the firing process of the present invention.
Figure 4:
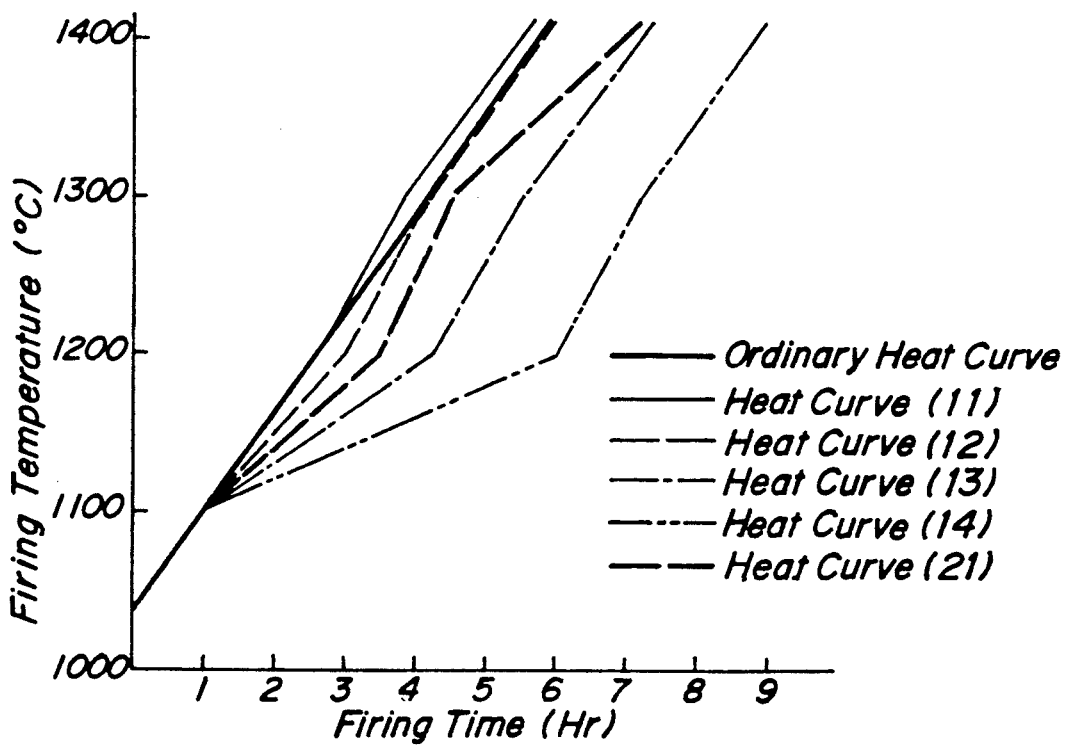
FIG. 4 is a graph illustrating an ordinary heat curve and heat curves (11), (12), (13), (14) and (21) for examining the firing process of the present invention.
Figure 5:
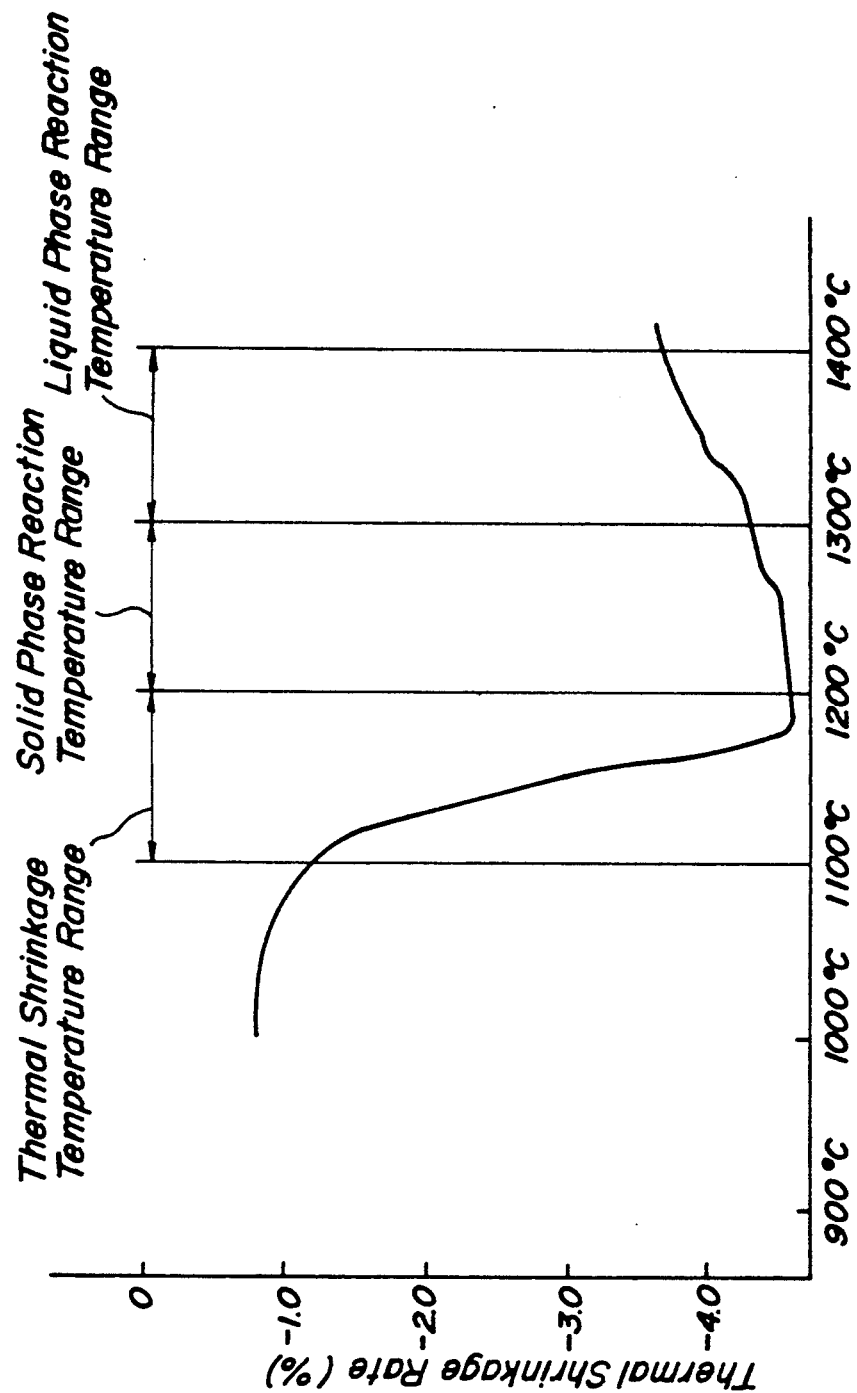
FIG. 5 is a graph illustrating the thermal shrinkage, solid phase reaction and liquid phase temperature ranges.

It is seen from the results in Table 2 that the honeycomb structural bodies fired according to the heat curves (11)–(21) exhibit superior results with respect to all the examined characteristics as compared with those fired according to the heat curves (1) through (10) in Table 1. In order to clarify the features of the heat curves, the heat curves in Tables 1 and 2 are illustrated in FIGS. 1 through 4. FIG. 1 shows the ordinary heat curve, and the heat curves 1, 2 and 3. FIG. 2 shows the ordinary heat curve, and the heat curves 4, 5, 6 and 7. FIG. 3 shows the ordinary heat curve, and the heat curves 8, 9 and 10. FIG. 4 shows the ordinary heat curve, and the heat curves 11, 12, 13, 14 and 21.

Japanese patent application laid-open No. 2-255,576 (commonly owned) discloses that honeycomb structural body having excellent dimensional accuracy can be obtained by setting the heating rate at not more than 60° C./hr in the temperature range of about 1,100° to about 1,200° C. in which the ceramic honeycomb structural body is thermally shrunk and in which rise in temperature of the honeycomb structural body is stopped for a given period. When this technique is combined with the present invention, the honeycomb structural body having excellent product characteristics and excellent dimensional accuracy can be obtained. Thus, such a combination of the 20°-60° C./hr heating and the stopping of the temeprature rise in the honeycomb structural body-shrinkage temperature range is included in the present invention.

As is clear from the above explanation, according to the ceramic honeycomb structural body-firing process of the present invention, the heating rate in the temperature range in which the cordierite-based honeycomb structural body is thermally shrunk is set at not more than 60° C./hr, the heating rate in the temperature range in which the solid phase reaction proceeds is set at not less than 80° C./hr, and the temperature range in which the liquid phase reaction proceeds is set at not more than 60° C./hr. Thereby, ceramic honeycomb structural bodies having a low coefficient of thermal expansion and a high water-absorbing rate can be obtained, while undesirable crystallization of cordierite is prevented. Further, various properties of the honeycomb structural bodies can be stably and excellently exhibited by varying the heating rates in the above three temperature ranges in appropriate combination, even when the composition of the raw materials varies.

What is claimed is:

1. A ceramic honeycomb structural body-firing process comprising the steps of:
    formulating a mixture of raw materials from talc, kaolin and other cordierite-forming materials to give cordierite having a chemical composition of $SiO_2$: 42-56% by weight, $Al_2O_3$: 30-45% by weight and MgO: 12-16% by weight as a main component and containing a crystalline phase mainly composed of cordierite;
    shaping a honeycomb structural body from the mixture by extrusion; and
    firing the honeycomb structural body in a first temperature range of about 1,000° C. to about 1,200° C. at a heating rate of not less than 20° C./hr and not more than 60° C./hr, in a second temperature range of about 1,200° C. to about 1,300° C. at a heating rate of not less than 80° C./hr and not more than 130° C./hr, and in a third temperature range of about 1,300° C. to about 1,400° C. at a heating rate of not less than 20° C./hr and not more than 60° C./hr, wherein the honeycomb structural body is thermally shrunk in the first temperature range, a solid phase reaction takes place in the second temperature range, and a liquid phase reaction takes place in the third temperature range.

2. The firing process of claim 1, wherein said heating rate in the first temperature range is not less than 30° C./hr and not more than 50° C./hr, the heating rate in the second temperature range is not less than 90° C./hr and not more than 110° C./hr, and the heating rate in the third temperature range is no less than 30° C./hr and not more than 50° C./hr.

3. The firing process of claim 1, wherein the chemical composition is $SiO_2$: 47-53% by weight, $Al_2O_3$: 32-38% by weight and MgO: 12.5-15% by weight.

* * * * *